(12) United States Patent
Hood

(10) Patent No.: US 8,439,258 B1
(45) Date of Patent: May 14, 2013

(54) COUNTERFEIT DETECTION SYSTEM AND METHOD

(76) Inventor: Darden Gwaltney Hood, Miami, FL (US)

(*) Notice: Subject to any disclaimer, the term of this patent is extended or adjusted under 35 U.S.C. 154(b) by 28 days.

(21) Appl. No.: 13/211,888

(22) Filed: Aug. 17, 2011

(51) Int. Cl.
*G06K 7/00* (2006.01)
(52) U.S. Cl.
USPC .......................................................... 235/435
(58) Field of Classification Search .............. 235/468, 235/435, 462.01, 469, 487
See application file for complete search history.

(56) References Cited

U.S. PATENT DOCUMENTS

| | | |
|---|---|---|
| 3,649,199 A | 3/1972 | Littlejohn |
| 4,022,876 A | 5/1977 | Anbar |
| 4,037,100 A | 7/1977 | Purser |
| 4,223,004 A | 9/1980 | Hsia et al. |
| 4,224,031 A | 9/1980 | Mee et al. |
| 4,454,233 A | 6/1984 | Wang |
| 4,701,419 A | 10/1987 | Morris |
| 5,045,479 A | 9/1991 | Newman et al. |
| 5,078,135 A | 1/1992 | Caprioli |
| 5,124,267 A | 6/1992 | Humpel et al. |
| 5,209,919 A | 5/1993 | Turteltaub et al. |
| 7,461,793 B2 * | 12/2008 | Gross et al. ................... 235/494 |
| 7,865,722 B2 * | 1/2011 | Moran et al. .................. 713/161 |
| 2007/0205288 A1 * | 9/2007 | Laser ....................... 235/462.46 |
| 2010/0264305 A1 | 10/2010 | Arjomand et al. |

* cited by examiner

*Primary Examiner* — Seung Lee
(74) *Attorney, Agent, or Firm* — Malloy & Malloy, P.L.

(57) ABSTRACT

An anti-counterfeit system comprises an item with at least one marker affixed thereto. The marker comprises a chemical signature having at least one chemical, and indicates the source of the item. The marker is detectable in the item to reveal whether the item is authentic or counterfeit. In at least one embodiment, the marker comprises a chemical signature that is unique to a particular entity and is affixed to items authentic to that entity. Further, a method of determining the authenticity of an item comprises isolating an item for testing, determining the presence of a marker, analyzing the marker for a chemical signature, comparing the results of the analysis to a chemical signature unique to a particular entity, and determining from the comparison whether the item is authentic or counterfeit. In some embodiments, the method further comprises quantifying the results of the analysis, such as the chemical(s) discovered therein.

14 Claims, 4 Drawing Sheets

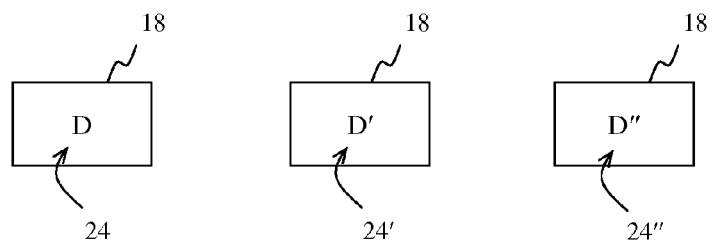
FIG. 2
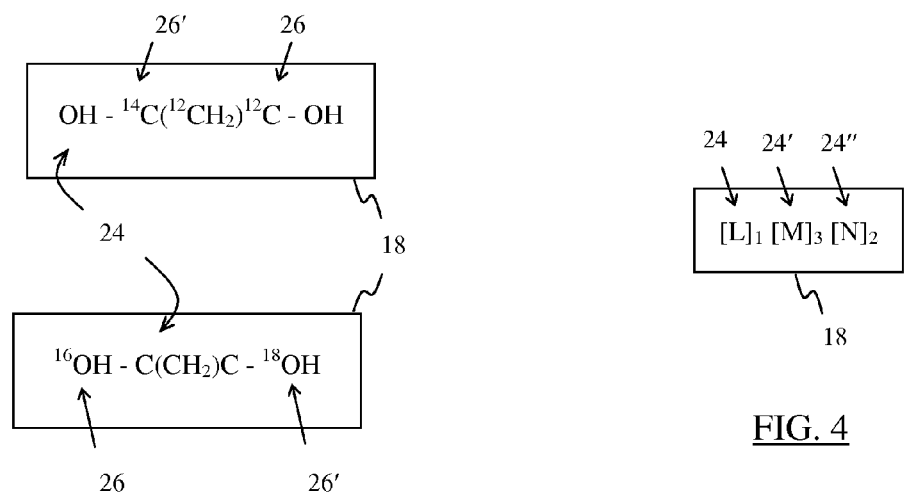
FIG. 3
FIG. 4

COUNTERFEIT DETECTION SYSTEM AND METHOD

BACKGROUND OF THE INVENTION

1. Field of the Invention

This invention relates to the identification and deterrence of counterfeit items. More specifically, the present invention relates to the use of a tag or tags to distinguish between authentic and counterfeit goods.

2. Description of the Related Art

Though imitation is said to be the highest form of flattery, the negative effects that imitation can have on the commercial success and reputation of the owner of an original or authentic item which it copies, counterfeits, or forges is anything but flattering. Counterfeit items are often made of inferior materials and poor quality, and sell for a fraction of the cost of the authentic items they mimic. Forgers take advantage of the reputation, popularity, and desire for authentic goods in order to turn a profit by selling imitation counterparts. In the process, the owner of the authentic items loses potential sales and the cost of research, development and advertising for the authentic item. The owner may even suffer a tarnished reputation and dilution as a result of the sub-standard counterfeit items. Even counterfeit items that are not egregiously fake detract from sales of authentic items, and the lower quality may be discovered by a consumer after purchase.

Counterfeit items range from the blatantly obvious to the innocuously convincing. Some are clearly fake and of significantly lower quality, and may even be purchased despite such knowledge. Some, however, appear to be genuine, perhaps even upon close inspection, but are actually fake and not made by the real owner. The latter type of counterfeit item is particularly troublesome, as it is harder to detect, and therefore, deter. It also causes direct damage to the owner of the authentic item, as reasonable purchasers could buy a fake thinking it is genuine.

As expected, many attempts have been made over the years by owners of authentic items to identify their products in such a way as to indicate the source origin and distinguish genuine items from counterfeits. For example, trademarks and trade names are used to indicate source origin. Tags and labels bearing trademarks or company names are often affixed to an item or its packaging to indicate its authenticity. However, counterfeiters can forge a trademark, or create a modified authentic trademark that passes as the trademark upon casual inspection, or even a spin-off of the trademark that plays on its familiarity.

Some owners have attempted to add an identifying mark to an item to indicate the source of the item and distinguish it from fakes. For example, cattle were branded with a rancher's unique mark. Letters have been sealed for centuries with a unique sign or insignia to indicate the origin and authenticity of the sealed document. However, the physical items which make such marks could easily be stolen or duplicated, thereby allowing a counterfeiter to operate under the guise of authenticity. More recently, watermarks have been added to paper money, documents, and software. These marks, however, can be forged, albeit by a skilled forger.

As counterfeiters become more adept at forgery, it becomes more difficult to detect fake goods. While it may not be possible to eradicate counterfeiting, the field is in need of stringent protection against counterfeiting that makes copying so difficult, complicated, and/or costly as to deter potential counterfeiters. Additionally, a rigorous way of identifying authentic items is also needed to sort out the close counterfeit items from the genuine ones.

SUMMARY OF THE INVENTION

The present invention is directed to an anti-counterfeit system and method of determining the authenticity of an item that utilizes a marker(s) having a specific chemical signature unique to an owner of authentic goods and which is affixed to an item(s). The marker(s) is detectable in the item(s), which can be analyzed to identify the components of the signature and verify the authenticity of the item, and thereby distinguish counterfeit and non-authentic items.

Specifically, the anti-counterfeit system comprises an item to which at least one marker is fixed. The marker comprises a chemical signature that indicates the source or origin of the item. The marker is detectable in the item on which it is fixed to reveal whether the item is an original (authentic) or a counterfeit.

In at least one embodiment, the marker comprises a chemical signature having at least one chemical, and the signature is unique to a particular entity. Moreover, the marker is affixed to items that are authentic or original to that entity. Accordingly, the marker is detectable therein, such as by analysis of the item and marker, and the item is identified as authentic.

In at least one other embodiment, a forged marker having a chemical signature, but one that does not match the precise unique chemical signature of a proprietary entity, is affixed to an item. Accordingly, analysis of the item reveals the fake marker and forged signature, and the item is identified as a counterfeit.

The unique and specific chemical signature of the marker is useful in determining whether an item is authentic or counterfeit. In at least one embodiment, the chemical signature comprises at least one chemical in a predetermined amount or concentration. In some embodiments, the chemical signature comprises a plurality of chemicals present in particular amounts or concentrations, or in a specified ratio. In some embodiments, the chemical(s) is biogenic, such as of recent plant origin. In some embodiments, the chemical(s) contains at least one isotope, which can be stable, unstable or radiogenic, and/or multiple isotopes present in a particular ratio. In still other embodiments, the chemical(s) is an analogue. In further embodiments, the chemical(s) comprises an element(s). In additional embodiments, the chemical signature comprises a combination of the above.

The present invention is also directed to a method of determining the authenticity of an item, which includes isolating an item to be tested, determining the presence of a marker(s), analyzing the marker(s) to identify a chemical signature if present, comparing the results obtained from the analysis with a chemical signature(s) that is unique to a particular entity, and determining from the comparison whether or not the item is authentic to that particular entity. In at least one embodiment, the method also includes quantifying the results of the analysis of the marker(s). In some embodiments, quantifying the results includes quantifying at least one chemical found upon analysis of the marker. Moreover, quantifying can include quantifying to a precise amount and/or to a predetermined level of specificity. In some embodiments, quantifying occurs by radiometric analysis. In at least some embodiments of the present method, determining the authenticity of an item comprises matching a known value within an authentic item to the amount measured within the analyzed material.

In at least one embodiment, the marker(s), and specifically its chemical signature, is used as an identifier to provide information of authenticity and source origin of the item, such as when the presence of a marker(s) on an item is not known prior to analysis. However, in another embodiment, the marker(s) can be used as a trace to follow items through the stream of commerce or other movement or transit, such as when a marker(s) is known to be affixed to a particular item.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2 is a schematic representation of various embodiments of the chemical signature of the marker comprising different chemicals.

FIG. 3 is a schematic representation of various embodiments of the chemical signature of the marker comprising different isotopes.

FIG. 4 is a schematic representation of the chemical signature of the marker comprising a plurality of chemicals of differing concentrations.

Like reference numerals refer to like parts throughout the several views of the drawings.

DETAILED DESCRIPTION OF THE PREFERRED EMBODIMENT

The present invention is directed to an anti-counterfeit system and method of determining the authenticity of an item that utilizes a marker having a specific chemical signature or signatures unique to an owner of authentic goods and which is affixed to an item(s). The marker(s) is detectable in the item(s), and can be analyzed to identify the components of the signature and verify the authenticity of the item, thereby distinguishing counterfeit and non-authentic items.

Figure 1:
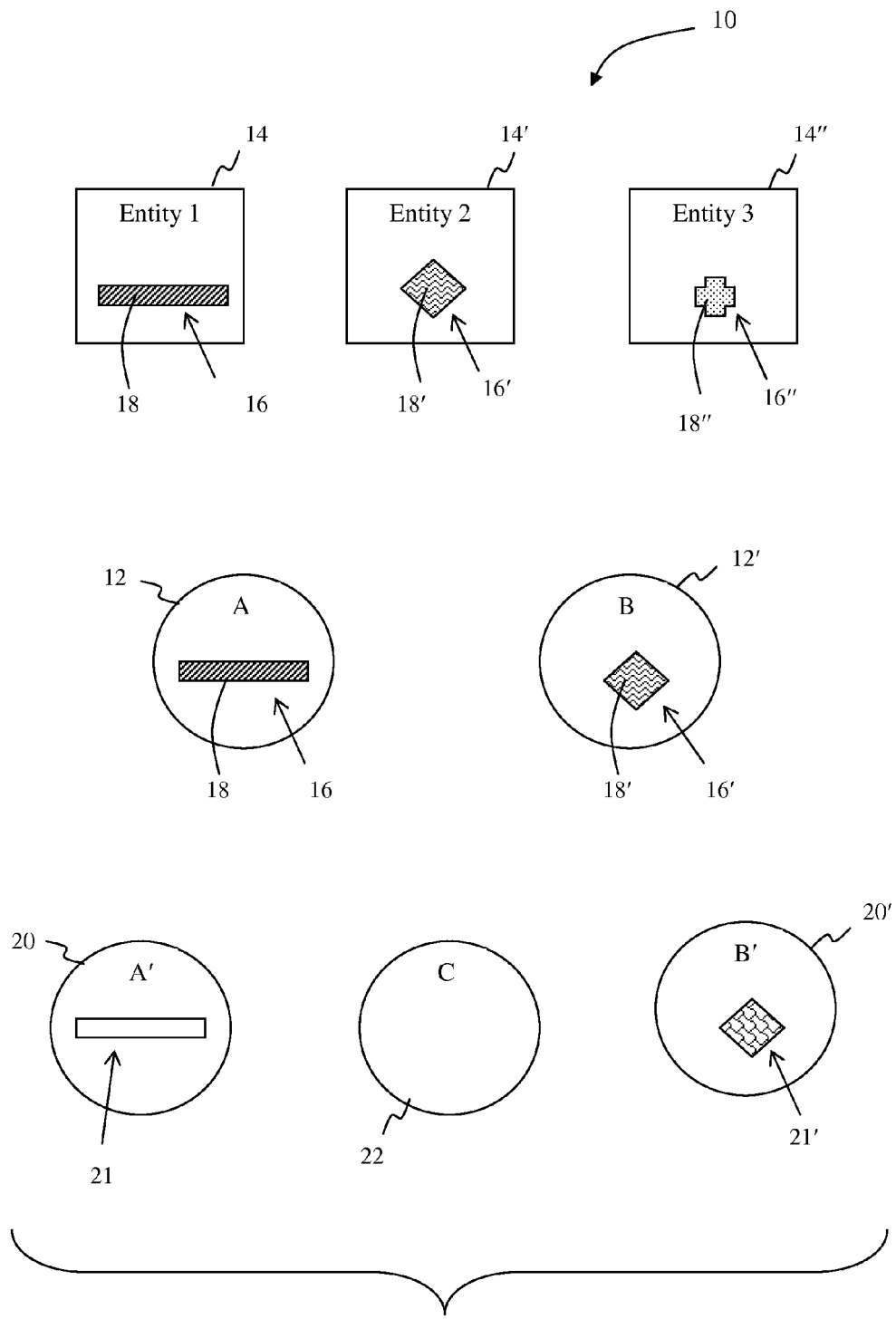
FIG. 1 is a composite view including schematic representation of the anti-counterfeit system of the present invention.

Specifically, the present invention is directed to an anti-counterfeit system 10, as depicted schematically in FIG. 1. The anti-counterfeit system 10 comprises an item 12 that is authentic to a particular entity 14, as well as a marker 16 having a chemical signature 18 that is unique to at least one particular entity 14. This marker 16 is fixed to at least a portion of the item 12 and is detectable in the item 12 to verify its authenticity. The chemical signature 18 of the marker 16 comprises at least one chemical 24, shown in FIGS. 2 through 4, and enables positive identification of the item 12 as authentic to a particular entity 14.

More in particular, and as shown in FIG. 1, the item 12 is any genuine or authentic article that is specific to a particular entity 14 and which is subject to the possibility of forgery or counterfeit activity. The item 12 is designed, manufactured, commissioned, ordered, or otherwise owned or controlled by the particular entity 14 to which it is authentic. For example, in at least one embodiment, the item 12 comprises, but is not limited to, an article of manufacture, such as an article of clothing, painting, paper document, accessory, or other manufactured item. In at least one other embodiment, the item 12 is a food product that may be consumed by people or animals, such as food, beverages, condiments, spices, dietary supplements, vitamins, medicines, or pharmaceuticals. In still another embodiment, the item 12 is a plant or plant product, such as a genetically modified or selectively bred species, fruit, flowers, or seeds. Moreover, the item 12 may be owned and/or subject to protective rights held by the particular entity 14, including property rights and/or intellectual property rights, such as trademark, copyright, patent and/or trade secret.

The particular entity 14 is any entity, such as a company, organization, or legal individual having a proprietary item or items they wish to protect from counterfeiting or forgery. For example, in at least one embodiment the entity 14 is a corporation, partnership, limited liability corporation, closely-held proprietorship, start-up company, organization, legal individual, or even a person, entrepreneur, or private business owner. In another embodiment, the entity 14 is domestic, foreign, international, or a parent, subsidiary or affiliate of another entity. In still other embodiments, the entity 14 is a for-profit, non-profit, or a charitable organization. Moreover, in at least one embodiment the entity 14 is a company that sells items 12, either through retail, wholesale, or distributors. In another embodiment, the entity 14 is a manufacturer of the items 12. In still a further embodiment, the entity 14 is a manufacturer of the marker 16.

As shown in FIG. 1, the marker 16 of the present system 10 comprises a chemical signature 18 that is unique to at least one particular entity 14. For example, in at least one embodiment, each particular entity 14 has its own marker 16 having a unique chemical signature 18 that is specific only to that particular entity 14. In at least one other embodiment, as shown in FIG. 1 and described in further detail hereinafter, there are a plurality of entities 14, 14', 14" each having its own particular marker 16, 16', 16" with a unique chemical signature 18, 18', 18", respectively. In at least one other embodiment, one marker 16 is indicative of a plurality of entities 14 (not shown), such as a family of related entities, or all the entities associated with a manufacturer of the marker 16.

The marker 16 may be of any state of matter, such as a gas, solid, or liquid, so long as it is capable of being fixed to, directly associated with, or interconnected to an item 12, as described in greater detail hereinafter. For example, and for illustrative purposes only, in at least one embodiment the marker 16 is a liquid that is mixed with and/or applied to the item 12, such as mixed with paint that is applied to a canvas, or mixed into dye that is applied to a textile. In at least one other embodiment, the marker 16 is a solid such as a polymer or fiber that is woven in with clothing, or thread that is used in stitching fabric, attaching a label or tag, or embossing a logo on an item 12. In still another embodiment, the marker 16 is a gas to which the surface of an item 12 is subjected so that the marker 16 sediments, precipitates, adheres, absorbs, or affixes to at least a portion of the item 12. In at least one further embodiment, the marker 16 is a mixture, and may be heterogeneous, such as a suspension, or homogeneous, such as a colloid. In one embodiment the marker 16 comprises a plurality of phases, such as a discrete and continuous phase. In at least one embodiment the marker 16 is an aerosol, gel, emulsion, foam, or solution. For example, in one embodiment the marker 16 is a liquid aerosol spray that is applied to the surface of an item 12. The above are examples only, and are not intended in any way to limit or restrict the contemplated forms the marker 16 can take.

In the present system 10, the marker 16 is fixed to or associates with at least a portion of the item 12, as depicted schematically in FIG. 1. Specifically, the marker 16 is fixed to a predetermined location on the item 12 as decided by the proprietary entity 14, so that later tests for authenticity of suspect items can be directed to the location on the suspect item where the marker 16, if present, is known to exist. For example, in one embodiment the marker 16 is fixed to the thread that is used for stitching, in which case only the stitching thread need be analyzed for the presence of marker 16 and/or chemical signature 18. In another embodiment, the marker 16 is fixed to a tag on the item 12, such that only the tag need be analyzed for the presence of the marker 16 and/or chemical signature 18. Further, in at least one embodiment the marker 16 is fixed to a predetermined location on an item 12 in an inconspicuous manner, such that it is not obvious where the marker 16 is located. Since the proprietary entity 14 knows the location of the marker 16 on authentic goods but counterfeiters do not, an unobvious marker 16 makes forging or counterfeiting such items 12 that much more difficult.

Moreover, the marker 16 is fixed to an item 12 in any manner that permits retention of the marker 16 at the applied location, and may be permanent or semi-permanent. For example, as described previously, in at least one embodiment the marker 16 is sewn into the item 12, such as a thread being sewn into a textile. In another embodiment, it is adhered to the item 12, such as by application of a stain or dye to fabric. In another embodiment it is mixed in with paint or an aerosol spray, so that when applied to an item 12 and allowed to dry, the marker 16 remains fixed to the item 12. It should be appreciated that these are merely examples and are not intended to be an exhaustive list of ways the marker 16 may be fixed to an item 12.

Though the marker 16 is fixed to or associated with the item 12, in at least some embodiments at least a portion of the marker 16 is removable therefrom. For example, in one embodiment the marker 16 comprises a physical form that can be cut, ripped, torn, or otherwise separated, whereby one portion of the marker 16 is removed from the item 12 and may be tested for authenticity, and the other portion(s) of the marker 16 remains attached to the item 12. In one embodiment, removal of a portion of the marker 16 is obvious and may be readily determined upon inspection of the item 12. In another embodiment, the removal of a portion of the marker 16 is not obvious.

The marker 16 of the present system 10 is further detectable in the item 12 and amenable to analysis in order to verify the authenticity of the item 12. Accordingly, suspect items, or portions thereof, can be examined and analyzed for the presence of a marker 16 and/or a specific and unique chemical signature 18, and any article that does not carry the particular marker 16 and/or chemical signature 18 bearing the mark of authenticity can therefore be revealed as unauthentic or counterfeit.

For example, FIG. 1 shows one embodiment of the present system 10 in which a plurality of entities 14, 14', 14" each have their own specific marker 16, 16', 16" and unique chemical signature 18, 18', 18", respectively. A suspect item 12 may be examined to reveal the presence of a particular marker 16 and unique signature 18 attached to that item 12. Since this marker 16 and signature 18 match that of one entity 14, the item 12 is genuine to that entity 14. It should be evident from FIG. 1 that item 12 is authentic only to one particular entity 14, and not other entities 14', 14". Another item 12' may be suspected, and analysis of this item 12' reveals the detection of a different marker 16', as well as a different unique chemical signature 18'. Since this marker 16' and signature 18' are unique to entity 14', the analysis reveals item 12' to be an authentic item of entity 14'.

Other suspect items, on the other hand, may appear to be authentic when in fact they are not. For example, FIG. 1 shows an item or product 20 that appears at first blush to be genuine, and even has a marker 21 appearing to match a particular entity 14. Closer inspection and analysis, however, reveals that marker 21 lacks the appropriate and unique chemical signature for the entity 14, and so product 20 is actually a counterfeit. Similarly, product 20' has a marker 21' that purports to be genuine for another entity 14', but it too lacks the unique chemical signature required to prove authenticity, having a different chemical signature. Accordingly, the product 20' is counterfeit and is not authentic to entity 14'. Some products 22, however, have no marker at all, fake or otherwise. Such products 22 are simply not authentic, and may or may not be counterfeit—that is to say, they may or may not be tried to be passed off as a genuine article of a particular company.

Accordingly, detection and analysis of a marker 16 and the chemical signature 18 contained therein is utilized to verify the authenticity of an item 12. Since the particular marker 16 and unique chemical signature 18 have been predetermined and specifically applied to authentic items 12, such as to precise locations, an owner of the authentic items 12 will know where to look for its particular marker 16 on suspect items, and what methods of detection will reveal its particular marker 16 and signature 18.

Indeed, with reference to FIG. 1, at least one embodiment of the present system 10 comprises an item 12 or product 20 to which at least one marker 16, 21 is affixed. This marker 16, 21 comprises a specific chemical signature that indicates the source or origin of the item 12 or product 20, and includes at least one chemical. This marker 16, 21 is further detectable on the item 12 or product 20 on which it is fixed or associated to reveal whether the item 12 or marker 20 is authentic (as in the case of an item 12), or counterfeit (as in the case of a product 20). This embodiment of the present system 10 encompasses not only genuine items 12 having authentic markers 16, but also counterfeit products 20 having a forged marker 21. A forged marker 21 is one which attempts to mimic, but fails to faithfully reproduce, a genuine marker 16.

The present system 10 contemplates the marker 16 being detectable in an item 12 by a variety of methods, limited only by the nature and characteristics of the chosen marker 16 and chemical signature 18. For example, in one embodiment, the marker 16 comprises a fluorescent chemical added to the thread that is used to sew jeans together. In this case, the marker 16 is detectable by shining a black light, or ultraviolet (UV) light, on the stitching of the jeans, which will fluoresce where the marker 16 is present. In another embodiment, the marker 16 comprises a compound of a known isotopic ratio, such as the ratio of carbon-13 to carbon-12 ($^{13}C/^{12}C$), and is applied to the fabric of the jeans. In this case, the marker 16 is detectable by analyzing it, or a portion of it, within at least a sample of the jeans in an isotope ratio mass spectrometer or equivalent device to reveal the isotopic ratio of the marker 16, such as its $^{13}C/^{12}C$ ratio.

In another embodiment, the marker 16 comprises an element, such as metal, added to the thread used to sew the tag onto a pair of jeans. In one example, the element is copper, and may be present in trace amounts. In this case, a sample of the thread is analyzed by scanning electron microscopy/energy dispersive electron spectroscopy (SEM/EDS) to reveal the presence or absence of a mineral or metal, such as copper, and the approximate concentration of the element contained therein. In still another embodiment, the marker 16 is a mixture of a biologically-derived chemical and a petrochemical in predetermined and known concentrations, and is applied to the thread of a pair of jeans. In this case, the marker 16 is detectable by analyzing the thread by radiometric analysis, such as radiocarbon analysis using a particle accelerator to reveal the ratio of carbon-14 (14C) to stable carbon (carbon-12 or carbon-13) present in the sample, which can only be attributable to the biologically-derived chemical, and therefore provides information of the mixture of chemicals comprising the signature 18. This particular and precise $^{14}$C ratio is the unique chemical signature 18 of the marker 16. In another example, the marker 16 is detectable in an accelerator mass spectrometer to reveal the precise amount of $^{14}$C in the marker 16, which is its unique chemical signature 18. The above embodiments are representative examples and should not be construed as limiting the system 10 of the present invention in any way.

Moreover, some embodiments comprise the use of only one marker 16. Other embodiments contemplate the use of a plurality of markers 16 on the same item 12, in which case the markers 16 and chemical signatures 18 may be fixed to different locations on the item 12, or may be fixed to the same location but comprise different characteristics, qualities, and/or aspects, such as that detection of the various markers 16 occurs by different methods. That is to say, the markers 16 can be used singularly or in combination, yielding various levels of protection from counterfeiting. For instance, a system 10 having a single marker 16 of a unique chemical signature 18 offers a high degree of protection, as a prospective counterfeiter would have to learn of and mimic the precise marker 16 and signature 18 of an item 12 to make a counterfeit product 20 that has a possibility of passing as authentic. However, a system 10 with a plurality of markers 16 each having their own chemical signature 18 offers added protection, since a counterfeiter would have to attempt to forge multiple levels of protection to avoid detection.

As can be appreciated from the above description, the chemical signature 18 of the marker 16 identifies the source origin of the item 12. In at least one embodiment, the chemical signature 18 is specific and unique to an owner of authentic goods, such as an entity 14. The presence or absence of the chemical signature 18, and its composition, therefore determines whether an item 12 is authentic, unauthentic, or counterfeit. In the present system 10, generally shown in FIG. 2, the chemical signature 18 comprises at least one chemical 24. "Chemical" is defined as a substance used in chemistry or resulting from a chemical process. Accordingly, the at least one chemical 24 can be a single element, a molecule, a compound or other mixture. The at least one chemical 24 can also comprise anhydrous or hydrate varieties of chemicals. In one embodiment, the at least one chemical 24 includes atoms, ions, or molecules that are associated in weak chemical combination with the at least one chemical 24, such as hydrates.

With particular reference FIG. 2, the at least one chemical 24 of the unique signature 18 is any chemical that is capable of being fixed to, or associated with, an item 12 and later detected and/or analyzed in that item 12. For example, in one embodiment the chemical 24 is unique or proprietary and of sole-source production and/or limited access. Accordingly, in this example the mere presence of this chemical 24 in the marker 16 is the unique chemical signature 14. It should be noted that in such an embodiment, the company producing or owning the rights to the proprietary chemical 24 may or may not be the same as the entity 14 for which the chemical 24 is used in a unique chemical signature 18.

In another example, the chemical 24 may have specific properties that enable easy detection. As mentioned previously, the chemical 24 in one embodiment is fluorescent and is detectable under the appropriate wavelength of light. In other embodiments, the chemical 24 is not necessarily fluorescent, but nevertheless only visible at a particular wavelength of light, or only after treatment with a particular reagent. In at least one embodiment, the chemical 24 is elemental. "Elemental" as used herein means comprising an element, such as can be found on the periodic table of elements. It is contemplated that the element(s) which comprise the chemical 24 can be solid, liquid, or gas; they may be reactive or inert; they may be metallic or non-metallic. For example, in one embodiment the chemical 24 comprises copper metal. In other embodiments, the chemical 24 is aluminum, nickel, titanium, sodium, potassium, calcium, palladium, etc. In another embodiment, the chemical 24 is not a single element, but rather an alloy, such as brass, bronze, steel, etc. In still other embodiments, the chemical 24 is elemental but non-metallic, such as sulfur, chlorine, fluorine, silicon, etc.

The chemical 24 can be any chemical, and may be organic or inorganic; complex or simple; acidic, basic or neutral; charged or uncharged; chiral or achiral; biological or non-biological, etc. In at least one embodiment, as depicted schematically in FIG. 2, the chemical 24' is an analogue. "Analogue" is defined herein as a chemical that is structurally similar to another chemical which it mimics, and yet is identifiably distinct therefrom. For example, in one embodiment, the analogue is labeled, such as with green fluorescent protein (GFP). In contrast, the chemical to which it is an analogue is structurally the same but lacks the GFP label. In this embodiment, the marker 16 is detectable by fluorescence of the GFP label, present only in the chemical 24' analogue. In another embodiment, the chemical 24' analogue is a derivative chemical or compound derived from a similar precursor chemical or compound. For example, a nitrogen atom in a precursor chemical may be replaced with a sulfur atom in the analogue 24', but the remainder of the chemical is structurally the same. These chemical analogues 24' often have different chemical or physical properties from the precursor chemical, and can therefore be detected and distinguished therefrom.

In still another embodiment, the chemical 24" is a particular kind of analogue that is derived or made from different source material than its structural counterpart. As depicted schematically in FIG. 2, in at least one embodiment the signature 18 comprises a chemical 24" that is biogenic. "Biogenic" is defined as a chemical produced from recently living or biological matter, or resulting from a life process. "Recently" or "recent" as used herein means primarily any time since approximately AD 1950 to today, but does not exclude prior years to AD 1950. It is used to qualify a period of time other than "fossil", which would be more than 40,000 years ago and indicative of the time of life process associated with chemicals derived from petroleum (aka petrochemicals). Accordingly, a biogenic chemical 24" is a chemical that is made from any natural raw material derived from biological incorporation of carbon in recent years. For example, in one embodiment the biogenic chemical 24" is Bio-PDO®, which is 1, 3-propanediol (PDO) derived from biological matter, specifically corn, rather than petrochemicals. Accordingly, Bio-PDO® is structurally the same as PDO, but is chemically distinguishable therefrom by its isotopic content, as described in further detail below. It should be appreciated, however, that Bio-PDO® is just one example of a biogenic chemical 24" and that the invention is not limited to the use of Bio-PDO®, but rather contemplates and encompasses the use of any biogenic chemical 24" or biochemical in the unique chemical signature 18 of a marker 16.

With reference to FIG. 3, in at least one embodiment, the chemical 24 of the signature 18 comprises a determinable amount of at least one isotope 26. A molecule of PDO is shown in FIG. 3 for illustrative purposes, although it should be understood that any molecule or chemical 24 may comprise the signature 18, as described above. The isotope 26 can be a common isotope 26 or a rare isotope 26', or any combination thereof. A "common" isotope 26 is defined as the isotope occurring predominantly in nature. For example, the common isotope of carbon is carbon-12 ($^{12}C$) occurring in 98.8% of all carbon. Other examples of common isotopes 26 include oxygen-16 ($^{16}O$) and nitrogen-14 ($^{14}N$). "Rare" isotopes 26' are defined as occurring in nature, but are not the predominant isotope. For example, carbon has two rare, or non-predominantly occurring, isotopes: carbon-13 ($^{13}C$), occurring with 1.2% frequency, and carbon-14 ($^{14}C$), occurring with $1 \times 10^{-12}$% frequency. Other examples of rare isotopes 26' include oxygen-18 ($^{18}O$), oxygen-17 ($^{17}O$), and nitrogen-15 ($^{15}N$). It should be appreciated that the above are illustrative examples of possible isotopes 26, 26' that can be used in the present invention, and should not be interpreted to limit the invention in any way.

In some embodiments, such as those depicted in FIG. 3, the signature 18 comprises at least one chemical 24 having at least one common isotope 26 and at least one rare isotope 26'. These can be isotopes 26, 26' of any element, such as carbon or oxygen, as shown. For example, one signature 18 shown in FIG. 3 comprises a rare isotope 26' of carbon, $^{14}C$. The other signature 18 comprises a rare isotope 26' of oxygen, $^{18}O$. Where isotopes are not indicated for a particular element in FIG. 3, it should be understood that the common isotope 26 of that element is referenced.

Moreover, in one embodiment the isotopes 26, 26', particularly the rare isotopes 26', are stable isotopes. "Stable" isotopes are defined as not being subject to decay. For instance, $^{13}C$ and $^{18}O$ are stable isotopes. In another embodiment, at least one isotope 26, 26' is unstable. "Unstable" isotopes are defined as subject to decay, such as radioactive decay. For example, $^{14}C$ is subject to radioactive decay, having a half-life of approximately 5700 years. Specifically, at least one embodiment of the chemical signature 18 comprises a determinable amount of the rare isotope $^{14}C$. The term "radiogenic" may also be used herein to refer to compounds, such as isotopes, that are created from, resulting from, or relating to radioactive decay. "Unstable" and "radiogenic" may be used interchangeably.

Importantly, embodiments of the marker 16 that have $^{14}C$, or other unstable isotope(s), only have amounts of unstable isotope within naturally occurring levels. That is to say, the marker 16 is not radioactive, nor does it add radioactivity to an item 12 to which it is applied. Rather, the marker 16 merely utilizes isotopes 26, 26' occurring in nature and within levels found in nature. "Natural levels" are defined as ranging from 0 percent Modern Carbon (pMC) to 190 pMC. For example, all biological material comprises some degree of $^{14}C$, albeit miniscule and perhaps even undetectable (as for biological material removed from a respiring system more then 50,000 years ago). Therefore, embodiments of the marker 16 containing biogenic chemicals 24" as described previously will have some amount of $^{14}C$ present therein, falling within natural levels, which can be determined by radiometric analysis. Embodiments of the signature 18 comprising a mixture of biogenic chemical(s) 24" and non-biogenic chemical(s) 24, such as petrochemicals, will also contain $^{14}C$, although less than the biogenic chemical(s) 24" alone, and attributable entirely to the biogenic chemical(s) 24".

Further, in embodiments of the marker comprising at least one unstable isotope 26', it is important that not only the amount and/or concentration of the isotope 26' is known, but also the approximate date of origination of the marker 16 and/or its components should be known. For example, in the case of a marker 16 comprising precise amounts of cellulose extracted from tree wood dating to 1963, it is beneficial to know that the cellulose originated from 1963 in determining not only the signature 18 of the marker 16, such as the amount of $^{14}C$, specifically if mixed with petrochemicals or other chemicals not containing unstable isotopes 26', but also so that the initial date can accurately be calculated if an item 12 is analyzed for marker 16 hundreds of years from now. This may be the case for certain applications of the present system 10 on long-lived items 12 in which isotopic decay can be observed over time, such as paintings, sculptures, legal documents, etc. that can persist for hundreds or thousands of years.

In further embodiments, the signature 18 comprises a plurality of isotopes 26, 26' in a known isotopic ratio. For example, in one embodiment, the signature 18 comprises a biogenic chemical 24" having a certain ratio of $^{14}C/^{12}C$. This ratio may be predetermined by the manufacturer of the marker 16 or the entity 14 in choosing the unique signature 18, such as by mixing a precise amount of biogenic chemical 24" with a precise amount of petrochemical or other chemical that lacks $^{14}C$. In other embodiments, the ratio is predetermined by nature, such as in the case of using just one chemical that is known to have a particular amount of $^{14}C$ naturally occurring therein. Moreover, in some embodiments, the plurality of isotopes 26, 26' are differing isotopes of the same element. In other embodiments, the plurality of isotopes 26, 26' are isotopes of different elements. For example, in one embodiment a chemical signature 18 requires a specific amount of $^{14}C$ and a specific amount of $^{18}O$ to be authentic.

Now that the various types of chemicals 24 used in the present system 10 have been described, we turn to other aspects of the marker 16. For example, as indicated previously, the chemical signature 18 comprises at least one chemical 24. In at least one embodiment, the chemical signature 18 comprises a predetermined amount of at least one chemical 24. "Amount" is defined as a quantity of something that is available, determinable, and/or quantifiable. The particular amount of the chemical 24 depends on the identity, nature, and characteristics of the chemical 24. The specific amount of the chemical 24 in the signature 18 is at the discretion of the proprietary entity 14 and/or the manufacturer of the marker 16, and is predetermined before the marker 16 is made and affixed to authentic items 12.

In at least one embodiment, as shown in FIG. 4, the signature 18 comprises at least one chemical 24 of a predetermined concentration. "Concentration" is defined as the amount per volume, and is a measurement of strength. For instance, in one embodiment the at least one chemical 24 is present as 5 parts per million (ppm). In another embodiment, the at least one chemical 24 is present at a concentration of 0.1 micrograms per milliliter (μg/mL). These are merely illustrative examples and are not meant to limit the invention in any way.

Similarly, in at least one embodiment, the marker 16 comprises at least one chemical 24 present to a predetermined level of specificity. "Specificity" is defined as a certain number of decimal places or significant figures. Accordingly, the marker 16 can comprise a very precise chemical signature 18, so that even small differences will reveal a forgery. For example, in one embodiment the marker 16 contains 0.0134 grams copper, such that a sample tested showing 0.0130 grams copper does not match the precise signature 18 of the marker 16, and is therefore a counterfeit.

Moreover, and returning to FIG. 4, at least one embodiment of the marker 16 comprises a mixture of a plurality of chemicals 24, each being present in a predetermined amount and/or concentration. In further embodiments, each of the plurality of chemicals 24 is present to a predetermined level of specificity. For example, in one embodiment a marker 16 comprises 5% Bio-PDO® and 95% PDO. In other embodiments, the marker 16 comprises a plurality of chemicals 24, and the signature 18 is the ratio of one chemical 24 to another chemical 24 within the marker 16. The ratio may compare the amounts or concentrations of chemicals 24, depending on how the signature 18 is defined by the entity 14 and/or manufacturer of the marker 16. In still other embodiments, the signature 18 comprises a plurality of chemicals 24, such that the marker 16 comprises a mixture of at least one biogenic chemical 24" and at least one non-biogenic chemical 24 in a predetermined ratio. In another embodiment, the marker 16 includes a mixture of at least one biogenic chemical 24" and at least one non-biogenic chemical 24 of predetermined amounts and/or concentrations.

Notably, when the marker 16 is manufactured for a particular entity 14, the chemical signature 18 is made unique to that entity 14 through the identities of the chemical(s) 24 contained therein, the precise amounts and/or concentrations in which they are present. That is to say, no two entities 14 (or families of entities, or manufacturers, if that is how the signatures 18 are established) will have the same chemical make-up of its marker 16. Each will be unique and different, and so the presence of a particular marker 16 with a particular signature 18 discovered on an item in the stream of commerce will indicate it is authentic to only one particular entity 14. On the other hand, an item in the stream of commerce that purports to be a genuine article but is found, upon analysis, to lack the appropriate marker 16 or signature 18 for the proprietary entity 14, is a counterfeit, as described in further detail below.

Figure 5:
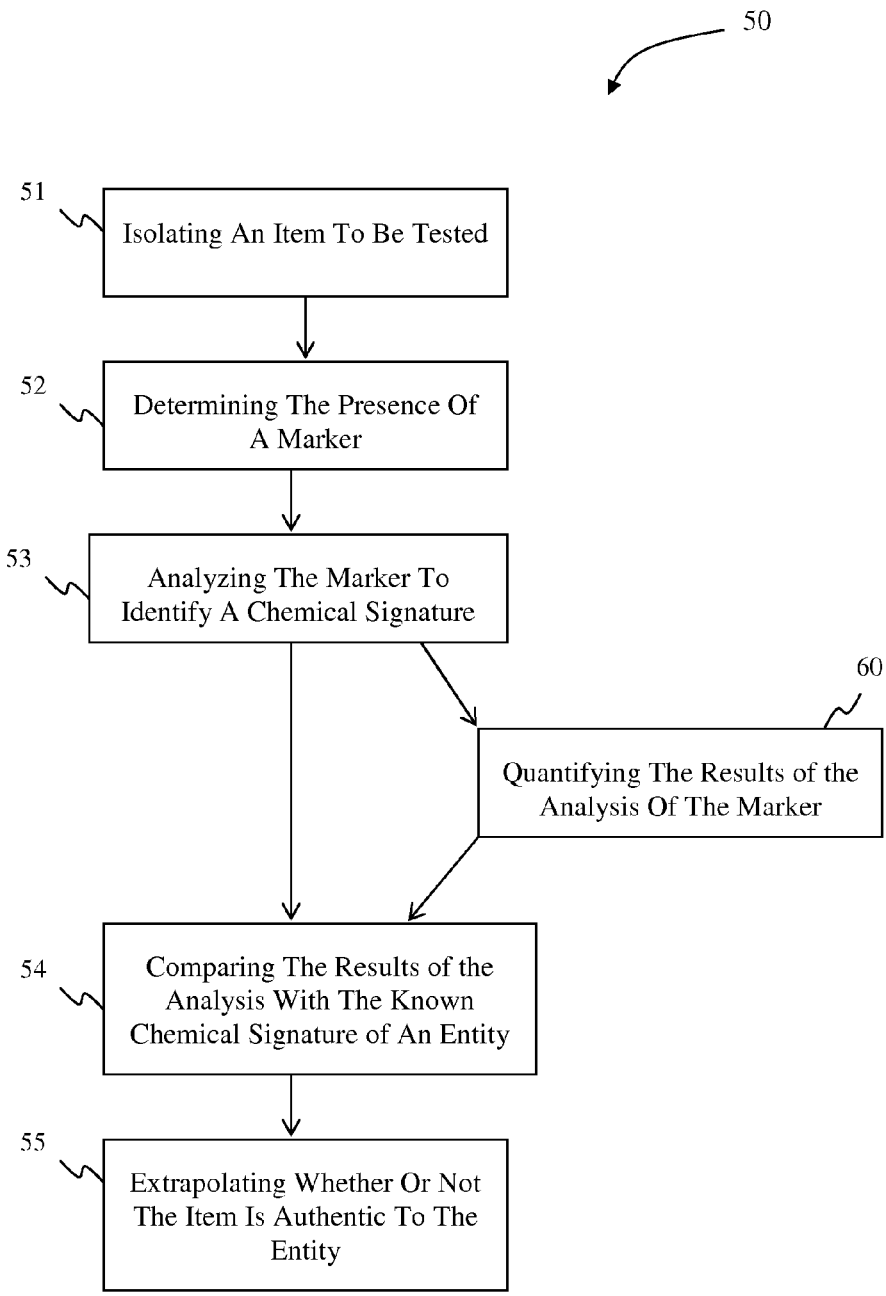
FIG. 5 is a diagram of one embodiment of the method of the present invention.

The present invention is also directed to a method of determining the authenticity of an item, generally indicated as 50 and illustrated in FIG. 5. The method 50 begins with isolating an item to be tested for authenticity, as at 51. For example, if an item is suspected of being counterfeit, or to verify the authenticity of an item thought to be genuine, a sample item can be isolated in order to test it for the presence of a marker. In one embodiment, isolating the item to be tested, as at 51, comprises removing or separating an item from the stream of commerce, such as pulling a sample pair of jeans off the shelf of a merchant for testing. In another embodiment, isolating the item to be tested, as at 52, comprises physically removing or separating a portion of the item to be tested, specifically, the portion of the item where the entity's 14 marker 16, if present, is known by the entity 14 to be located. For example, the stitching may be removed from a pair of jeans, or the tag removed from a shirt, or a paint chip excised from a painting, etc. In another embodiment, isolating the item to be tested, as at 51, comprises chemically separating a portion of the item for analysis. For example, a suitable solvent may be applied to a corner of a legal document and blotted, so that the marker 16, if present, will dissolve in the solvent and be transferred to the blot paper for subsequent analysis. In another example, isolation occurs by chemically or physically segregating a portion of the item rather than removing it.

The method 50 further comprises determining the presence of a marker, as at 52. In particular, the item is inspected, tested or analyzed to determine whether a marker exists on the item. This determination can be a general or initial determination, such as to determine whether further tests should be performed to better evaluate the marker. Accordingly, the determination of the presence of a marker, as at 52, is largely qualitative in nature.

If a marker is found, the method 50 further comprises analyzing the marker to identify a chemical signature if present, as at 53. This analyzing step can occur by a variety of methods, and depends on the composition of the marker 16 and signature 18 in question. The specific characteristics of the marker 16 and signature 18 also dictate how detailed the analysis 53 must be to identify not only if a chemical signature 18 is present, but also its components. Accordingly, there are multiple levels of analysis 53 that can be performed, depending on the level of protection afforded by the marker 16. For example, in one embodiment, analyzing the marker, as at 53, comprises subjecting a portion of the item to a black light or ultraviolet wavelength light. Such analysis 53 will determine if a fluorescent chemical 24 is present, and is useful if the marker 16 and/or signature 18 include a fluorescent chemical 24. However, further levels of protection may be present, and therefore additional and/or more detailed analyses may be required. For instance, in another embodiment, analysis of the marker, as at 53, comprises subjecting a portion of the item containing the marker, or an extract thereof, to analytical chemical methods to identify the chemical(s) 24 present in the sample. Some such analytical chemical methods include spectroscopic analysis, such as Fourier transform infrared spectroscopy (FTIR), mass spectroscopy, such as gas chromatography-mass spectroscopy (GC-MS), nuclear magnetic resonance spectroscopy (NMR), as well as other analytical methods, such as extraction, distillation, conductivity, chromatography, and electrophoresis. In at least one embodiment, analyzing the marker, as at 53, occurs as a blind analysis, meaning that the technicians performing the analysis do not know the composition of the marker 16 or its signature 18. Therefore, the technicians will report only what is found in the analysis, and will not be swayed or biased to report what is or is not in the marker 16 or signature 18. In still another embodiment, analysis of the marker, as at 53, occurs by microscopy, which can be useful in determining the existence of particular metals or minerals in a sample that may be known to be present in a given marker 16. For instance, SEM and/or EDS can be used to determine the presence of minerals and trace elements, such as copper. In at least one other embodiment, isotopic analysis is performed to determine the presence of particular isotopes, such as $^{14}C$. In some of these embodiments, such as analysis for the presence of $^{14}C$, the identification of biogenic chemicals can also be achieved, since only biogenic chemicals will contain $^{14}C$.

The method 50 further comprises comparing the results obtained from the analysis with a chemical signature unique to a particular entity, as at 54. More in particular, once an item 12 has been tested, its marker 16 analyzed and the chemical signature 18 therein identified (if any exist), the particular array of chemicals discovered in the tested marker (or lack thereof) are compared to the chemical(s) known to comprise a chemical signature 18 unique to a given entity 14. The degree of identity between the marker and signature of the tested item with the marker 16 and signature 18 of the entity 14 will provide information on the authenticity of the tested item. For example, if a particular item is suspected of being a counterfeit of items proprietary to Company A, and Company A has its own specific marker 16 of a unique chemical signature 18, then the results of the testing and analysis of the suspected item are compared to the marker 16 and chemical signature 18 for Company A. It should be appreciated that in order to accomplish the comparison step 54, the marker 16 and chemical signature 18 of a particular entity 14 to which comparison is made should be known.

The method further comprises determining from the comparison whether or not the item is authentic to the particular entity, as at 55. Specifically, once analysis of the marker of a suspected item is complete and the results are compared to a particular marker 16 and chemical signature 18 of an entity 14, the degree to which the analysis results match the chemical signature 18 of the marker 16 will indicate whether the tested item is authentic or counterfeit. For example, if a tested item has all the same compounds of Company A's marker 16 and chemical signature 18, then it can be determined that the tested item is authentic. If the tested item reveals only some, but not all, of the compounds of Company A's marker 16 and signature 18, then it can be determined that the item is a counterfeit. Similarly, if the tested item contains none of the compounds of Company A's marker 16 or signature 18, but visually appears to be an item proprietary to Company A, then it can also be determined that the item is counterfeit. However, if it does not appear to purport to be a Company A item, then it is simply inauthentic.

Figure 6:
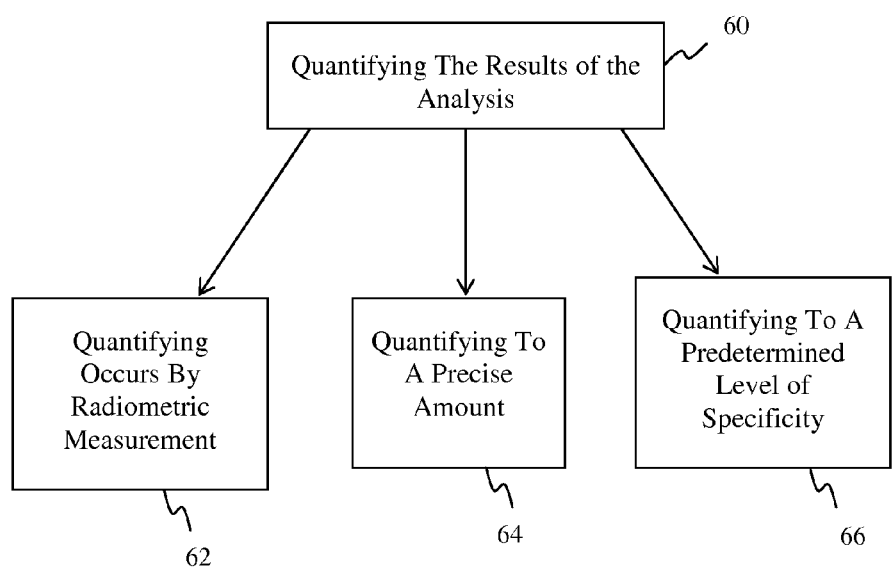
FIG. 6 is a diagram of various steps of quantifying the method in accord with the embodiment of FIG. 5.

In at least one embodiment, the present method 50 further comprises quantifying the results of the analysis of the marker, as at 60, shown in FIGS. 5 and 6. This step is particularly useful in embodiments where the chemical signature 18 of the marker 16 to be compared against comprises specific amounts or concentrations of chemical(s) 24. Accordingly, a quantitative analysis is needed to adequately compare the results of the tested marker against the known marker 16. Quantification can occur by any method and with the use of any instrumentation that will yield a quantitative measurement of the particular chemical(s) 24 in the tested marker, in view of what is known to be in the marker 16 to be compared against. For example, in one embodiment quantifying occurs by extracting and separating the chemical(s) 24 from the tested sample, and determining the mass of each, such as by drying the chemical(s) 24 and weighing them. In another embodiment, quantifying occurs by SEM/EDS, such as would be appropriate for metal and mineral compositions. In another embodiment, quantifying occurs by isotopic measurement, such as to determine the precise amounts of $^{13}C$ and $^{12}C$ and determine the ratio of one to the other.

In still other embodiments, quantifying occurs by radiometric measurement, as at 62 and shown in FIG. 6. Radiometric measurement is used to determine the amount of an unstable isotope present in a sample. For example, the amount of $^{14}C$ can be determined by radiocarbon measurement, such as according to ASTM-D6866 protocol. This is particularly useful when the sample and known marker 16 contain biogenic chemical(s). Determining the amount of $^{14}C$ in a sample is an elaborate and difficult endeavor. Having a marker 16 containing a very specific amount of $^{14}C$ provides a high degree of protection, since would-be counterfeiters are far less likely to undertake $^{14}C$ analysis to determine and then create a forged marker due to these obstacles.

Moreover, and with continued reference to FIG. 6, at least one embodiment comprises quantifying to a precise amount, as at 64. For example, in one embodiment, the chemical signature 18 of the marker 16 comprises 5% Bio-PDO®. In another embodiment, the chemical signature 18 comprises 0.014 milligrams trace copper. Accordingly, the method 50 includes a step of determining the precise amount of each component chemical 24 in the marker 16.

FIG. 6 also shows at least one embodiment wherein quantifying further comprises quantifying to a predetermined level of specificity, as at 66. Specifically, in some embodiments the chemical signature 18 of the marker 16 includes one or more chemicals 24 present to a high degree of specificity. For instance, as discussed above, in one embodiment the chemical(s) 24 comprising the chemical signature 18 is known to four decimal places. In another embodiment, the chemical(s) 24 is present to a particular number of significant figures. In such embodiments, quantification is capable of determining the precise amount or concentration of each chemical 24 present therein to the predetermined level of specificity required by the signature 18. This can occur by any quantifying means, mechanism, or instrumentation that is capable of achieving the required level of specificity and sensitivity to render a proper reading.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:
1. An anti-counterfeit system comprising:
an item authentic to at least one particular entity,
at least one marker comprising a chemical signature unique to said at least one particular entity,
said chemical signature comprising at least one biogenic chemical,
said at least one marker fixed to at least a portion of said item, and
said at least one marker detectable in said item to verify the authenticity of said item.
2. The system of claim 1 wherein said at least one chemical comprises at least one isotope.
3. The system of claim 2 wherein said at least one chemical comprises a plurality of isotopes in a known isotopic ratio.
4. The system of claim 1 wherein said at least one chemical is elemental.
5. The system of claim 1 wherein said at least one chemical is an analogue.
6. The system of claim 1 wherein said chemical signature comprises a predetermined amount of at least one chemical.
7. The system of claim 1 wherein said chemical signature comprises a predetermined concentration of said at least one chemical.
8. The system of claim 1 wherein said chemical signature comprises a mixture of a plurality of chemicals in a predetermined ratio.
9. A biosignature anti-counterfeiting system comprising:
an item authentic to a particular entity,
a marker comprising a predetermined amount of biogenic chemical,
said biogenic chemical comprising 1,3-propanediol derived from biological matter,
said marker being unique to at least one particular entity,
said marker fixed to at least a portion of said item at a predetermined location on said item, and
said marker structured to indicate the authenticity of said item upon detection.
10. The biosignature system of claim 9 wherein said marker comprises a determinable amount of at least one isotope.
11. The biosignature system of claim 10 wherein said at least one isotope is carbon-14 and said determinable amount of carbon-14 is within naturally occurring levels.
12. The biosignature system of claim 9 wherein said marker comprises a mixture of at least one biogenic chemical and at least one non-biogenic chemical in a predetermined ratio.
13. A biosignature anti-counterfeiting system comprising:
an item authentic to a particular entity,
a marker comprising a predetermined amount of biogenic chemical,
said marker comprising a determinable amount of at least one isotope, said at least one isotope being carbon-14 and said determinable amount of carbon-14 being within naturally occurring levels, said marker being unique to at least one particular entity, said marker fixed to at least a portion of said item at a predetermined location on said item, and said marker structured to indicate the authenticity of said item upon detection.

14. The biosignature system of claim 13 wherein said marker comprises a plurality of isotopes in a known isotopic ratio.

* * * * *